(No Model.)

R. J. DEARBORN.
SCREW THREADING DIE.

No. 480,175.　　　　　　　　Patented Aug. 2, 1892.

Witnesses.
Fred S. Greenleaf.
Edward F. Allen.

Inventor:
Richard J. Dearborn
by Crosby & Gregory
Attys.

THE NORRIS PETERS CO., PHOTO-LITHO., WASHINGTON, D. C.

UNITED STATES PATENT OFFICE.

RICHARD J. DEARBORN, OF BOSTON, MASSACHUSETTS, ASSIGNOR OF ONE-HALF TO THE TRIMONT MANUFACTURING COMPANY, OF PORTLAND, MAINE.

SCREW-THREADING DIE.

SPECIFICATION forming part of Letters Patent No. 480,175, dated August 2, 1892.

Application filed March 31, 1891. Serial No. 387,090. (No model.)

*To all whom it may concern:*

Be it known that I, RICHARD J. DEARBORN, of Boston, county of Suffolk, and State of Massachusetts, have invented an Improvement in Screw-Threading Dies, of which the following description, in connection with the accompanying drawings, is a specification, like letters on the drawings representing like parts.

This invention has for its object the production of a novel die adapted especially to cut threads on the opposite side edges of a bar quadrilateral in cross-section.

Prior to this invention it has been customary to provide screw-threading dies with three or four series of cutting-lips arranged on an angle; but with such forms of dies as heretofore made it is not possible to cut threads on the two opposite edges of a quadrilateral bar and leave the other two edges unthreaded, and this kind of work has been done with a lathe-tool, the bar to be threaded at its edges being held in a suitable chuck or holder. To avoid putting these bars into a lathe and cutting the threads in the lathe, which is a slow and expensive process, I have by experiment devised a die which may be readily made to cut screw-threads on the opposite edges of bars—such, for instance, as the jaws of wrenches—leaving the other two sides uncut or flat. I am enabled to do this by providing the die with series of teeth, the said series being located sufficiently close together to enable two or more of the series to always remain in contact with each edge to be cut, such arrangement of teeth enabling some to act as guides for the others, or one to act as a holder while the other acts as a cutter. In my experiments I find, therefore, that the series of teeth must be separated more or less, according to the thickness of the bar, the edges of which are to be cut, for, as stated, each cutter must have two or more teeth to bear upon each edge to be cut.

Figure 1:
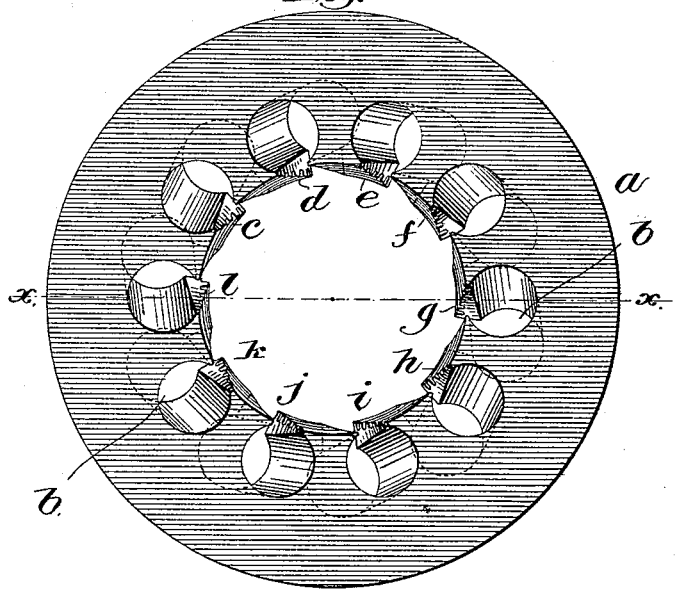
Figure 2:
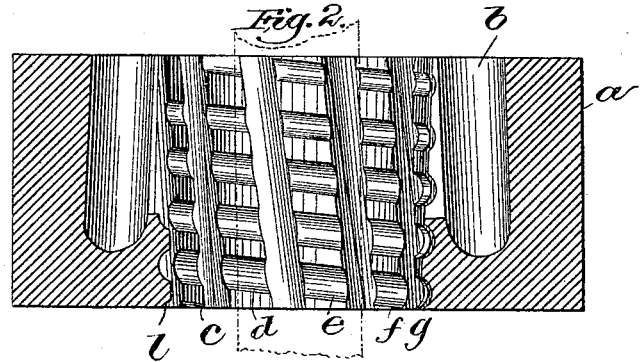
Figure 3:
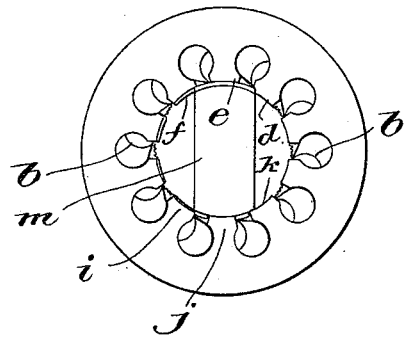

Figure 1 on an enlarged scale represents the leading end of a cutter embodying my invention. Fig. 2 is a section on the line $x\,x$, Fig. 1, both said figures being considerably enlarged. Fig. 3 shows the opposite end of the die to that shown in Fig. 1 and a bar in place in the position it will occupy while being cut.

To manufacture the die herein shown, the block $a$ of steel, from which the die is made, will be bored centrally and will be provided with a series of inclined holes $b$, surrounding the central hole. The inner wall of the large central hole is provided with cutting-teeth by the employment of a hob-tap, and thereafter the small diagonal holes are cut through at one side to intersect the central hole, leaving inclined series of cutting-teeth $c\,d\,e\,f$, &c.

Referring to Fig. 3, it will be noticed that the series of teeth $d\,e\,f$ touch one edge of the bar $m$, while the series of teeth $i\,j\,k$ touch the other edge of the bar, each series in succession coming upon and going off the edge of the bar to be cut, the spaces between the series of teeth being in every instance of less width than the thickness of the bar, the thin edges of which are to be provided with screw-threads.

In the threading operation the leading cutting-tooth of each diagonal series of teeth contacts with the edge to be threaded before the rear tooth of the series, this following because of the diagonal location of each series of teeth with relation to the longitudinal center of the bar to be threaded, and in this way it will be seen that the teeth at the rear of the die remain always in engagement with the threads already cut upon the bar, while the cutting-teeth of the die—viz., those at the front of the die—are acting to cut the metal gradually. In other words, the rear or grinding tooth or teeth of each series of teeth at the rear end of the die engage spaces already cut in the bar, while the cutting-teeth of that series are entering and about to cut the bar.

If there were but four series of teeth in the die herein shown and they were located ninety degrees apart and with the same inclination as represented in the drawings, with such a die (a common form) the thin edges of the quadrangular bar could not be cut, for two series of teeth would not be at the same time in engagement with either edge being cut, and consequently the edge would slip from the series of cutting-teeth and enter the spaces between the teeth, so that the next series of teeth would "hog" into, as it is called, and destroy the thread made by the first series of teeth, or else it would break the die and render it useless.

By the employment of narrow series of teeth of considerable number ample clearance is provided for the chips.

Viewing Fig. 1 of the drawings, it will be noticed that the pitch or spiral trend of the series of teeth is such that a line drawn longitudinally through the die and intersecting its center will always cut through at least two series of teeth, and the edge of the bar to be cut is never free from the leading tooth $g$ in a thread already cut when a cutting-tooth is acting upon the said edge to cut it.

To afford greater clearance for the die, I prefer to cut the series of teeth so that their faces incline not only spirally but also from the leading end of the die, having cutting-teeth $c$ inwardly toward the rear end of the die, where are located the guiding-teeth.

I claim—

The herein-described die for cutting teeth on the thin edges of quadrilateral bars, it comprehending a block having inclined series of spiral teeth, each series being arranged with relation to the others, substantially as described, whereby the leading tooth of one series and the cutting-tooth of another series are in a line extending longitudinally through the die and intersecting its center, and clearance-spaces between the series of teeth of less width than the thin edges of the bar to be cut, teeth of two or more series always being in contact with each thin edge of the bar, to operate substantially as described.

In testimony whereof I have signed my name to this specification in the presence of two subscribing witnesses.

RICHARD J. DEARBORN.

Witnesses:
 GEO. W. GREGORY,
 EDWARD F. ALLEN.